(No Model.)

L. ATWOOD.
GEAR WHEEL.

No. 430,819. Patented June 24, 1890.

Witnesses
Alex. Barkoff
William D. Conner

Inventor:
Leonard Atwood
by his Attorneys
Howson & Howson

UNITED STATES PATENT OFFICE.

LEONARD ATWOOD, OF PHILADELPHIA, PENNSYLVANIA.

GEAR-WHEEL.

SPECIFICATION forming part of Letters Patent No. 430,819, dated June 24, 1890.

Application filed March 20, 1890. Serial No. 344,663. (No model.)

*To all whom it may concern:*

Be it known that I, LEONARD ATWOOD, a citizen of the United States, residing in Philadelphia, Pennsylvania, have invented a certain Improved Gear-Wheel, of which the following is a specification.

The object of my invention is to construct a split gear-wheel made of a number of parts and bolted together, substantially as described.

My invention is especially applicable for use in gearing connecting an electric motor with the driven axle of an electric car.

Figure 1:
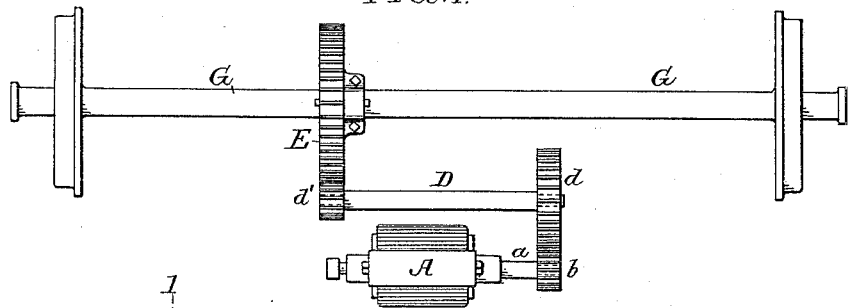
Figure 2:
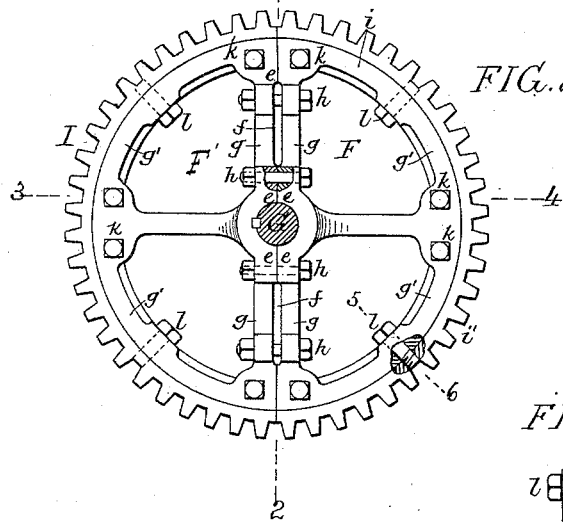
Figure 3:
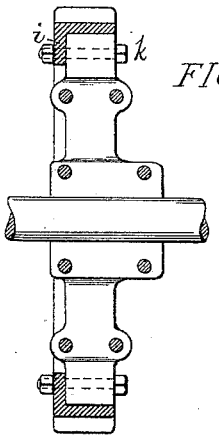
Figure 6:
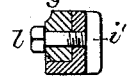
Figure 4:
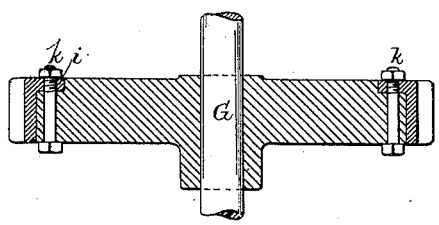
Figure 5:
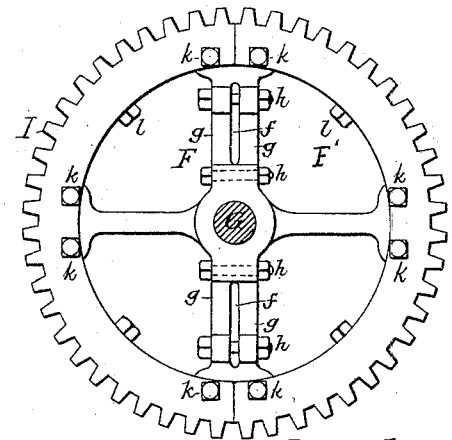

In the accompanying drawings, Figure 1 is a diagram plan view showing the application of my gear-wheel to a motor and axle of a motor-car. Fig. 2 is a side view of the gear-wheel. Fig. 3 is a section on the line 1 2, Fig. 2. Fig. 4 is a section on the line 3 4, Fig. 2. Fig. 5 is a rear view of the wheel; and Fig. 6 is a sectional view on the line 5 6, Fig. 2.

I have found that in gearing an electric motor to the driving-axle of a motor-driven car rigid gearing is objectionable, and that the car will often remain standing with a moderately heavy load, owing to the fact that there is rigid gearing between the shaft of the motor and the driven axle, whereas the power exerted would be sufficient to propel the car if once started. I have also found by placing one or more elastic gears in the train that the car can be more easily started, and the liability of breaking the teeth of the gear averted to a certain extent.

Referring to Fig. 1, A is the motor, mounted in any suitable manner on the car-frame.

$a$ is the motor-shaft, having a pinion $b$ meshing with a gear-wheel $d$ on an intermediate shaft D. At the opposite end of this shaft is a pinion $d'$, gearing into a built-up gear wheel E on the axle G of the car.

My present invention relates particularly to the built-up gear-wheel E. I prefer to make the teeth of the gear-wheel E and the pinion $b$ of phosphor-bronze, and I make the pinion $d'$ of steel, and the gear-wheel $d$, I provide with wooden teeth, as I find this combination preferable in gearing used on this class of work. The body or center of the gear-wheel E is made of two sections F F', spanning the axle G, one of said sections having a key-seat to which is adapted the key for securing the wheel to the shaft. Each of these sections is cut away at $ff$ to allow for the true fitting of the bearing-surfaces $e$ $e$. Bolts $h$ pass through the spokes $g$ $g$ of each section, firmly securing the two sections together. The center of the wheel may be made up of more than two sections, if required, depending altogether upon the diameter of the wheel.

I is a ring snugly fitting over the center, composed of two sections F F', said ring having a flange $i$ through which pass the transverse securing-bolts $k$ $k$, by which the ring is fastened to the center. The ring is also secured to the flange $g'$ of each section by radial screw-bolts $l$, which are tapped into the ring, as clearly shown in Figs. 2 and 6. The ring I is provided with gear-teeth $i'$, and this ring and its teeth are preferably made of phosphor-bronze.

By the above construction I am enabled to provide a wheel which is especially applicable to gearing for motors, and by making the wheel in sections, as shown, it can be readily removed from its shaft, repaired, and replaced without dismantling the other parts of the driving mechanism.

The ring can be readily removed from the center and replaced or repaired without removing the center from the shaft.

I claim as my invention—

1. The combination, in a built-up gear-wheel, of the sections F F', having abutting bearing-surfaces $e$, bolts $h$, passing through the spokes $g$ of each section, whereby the sections are secured together, a ring I, provided with gear-teeth, with radial bolts passing through the flange of each section and into the ring, substantially as described.

2. The combination of the sections F F', forming the center of a gear-wheel, bolts $h$ $h$, passing through the spokes $g$ $g$ of each section, a flanged ring I, provided with gear-teeth, transverse bolts $k$ $k$, passing through the flange $i$ of the ring and the flange $g'$ of each section, and radial bolts $l$, passing through the flange $g'$ and into the ring I, substantially as described.

In testimony whereof I have signed my name to this specification in the presence of two subscribing witnesses.

LEONARD ATWOOD.

Witnesses:
 WM. D. CONNER,
 HENRY HOWSON.